United States Patent [19]

Drake et al.

[11] 4,335,964

[45] Jun. 22, 1982

[54] INJECTION SYSTEM FOR SOLID FRICTION REDUCING POLYMERS

[75] Inventors: Bruce S. Drake, Midland; Vitold R. Kruka, Houston, both of Tex.

[73] Assignee: Shell Oil Company, Houston, Tex.

[21] Appl. No.: 224,851

[22] Filed: Jan. 5, 1981

Related U.S. Application Data

[62] Division of Ser. No. 965,804, Dec. 4, 1978, Pat. No. 4,263,926.

[51] Int. Cl.³ .............................................. B01F 11/00
[52] U.S. Cl. .................................. 366/114; 222/239; 366/156; 366/319
[58] Field of Search .................... 366/156, 157, 69, 76, 366/77, 81, 98, 186, 318, 319, 320, 322, 323, 97, 114, 115, 111, 110; 137/13; 425/207, 208; 222/239

[56] References Cited

U.S. PATENT DOCUMENTS

| | | | |
|---|---|---|---|
| 1,496,807 | 6/1924 | Bullock | 366/603 |
| 2,864,593 | 12/1958 | Shoup | 366/319 |
| 2,944,292 | 7/1960 | Norrhede | 366/319 |
| 3,231,243 | 1/1966 | Armstrong | 366/76 |
| 3,552,722 | 1/1971 | Sutter | 366/319 |
| 3,563,514 | 2/1971 | Shattuck | 366/76 |
| 4,061,316 | 12/1977 | Austin | 366/319 |

*Primary Examiner*—Robert W. Jenkins

[57] ABSTRACT

A method and apparatus are provided for maintaining polymer particles in readily recoverable, discrete form, and for injecting the particles into a pipeline hydrocarbon by disposing particulate polymer within a storage hopper having a cone bottom and an auger extending upwardly from the bottom, rotating the auger to cause the polymer particles to revolve in the hopper, reversing the rotation of the auger to pass polymer particles downwardly into a mixing chamber below the hopper, the particles passing through a rotary metering valve, or optionally, a bin activator, intermediate storage and rotary metering valve at the upper end of the chamber, simultaneously spraying a liquid such as oil or water tangentially in the chamber optionally agitating the chamber and removing a slurry of particulate polymer and the liquid from the chamber and injecting the slurry into a pipeline hydrocarbon.

4 Claims, 2 Drawing Figures

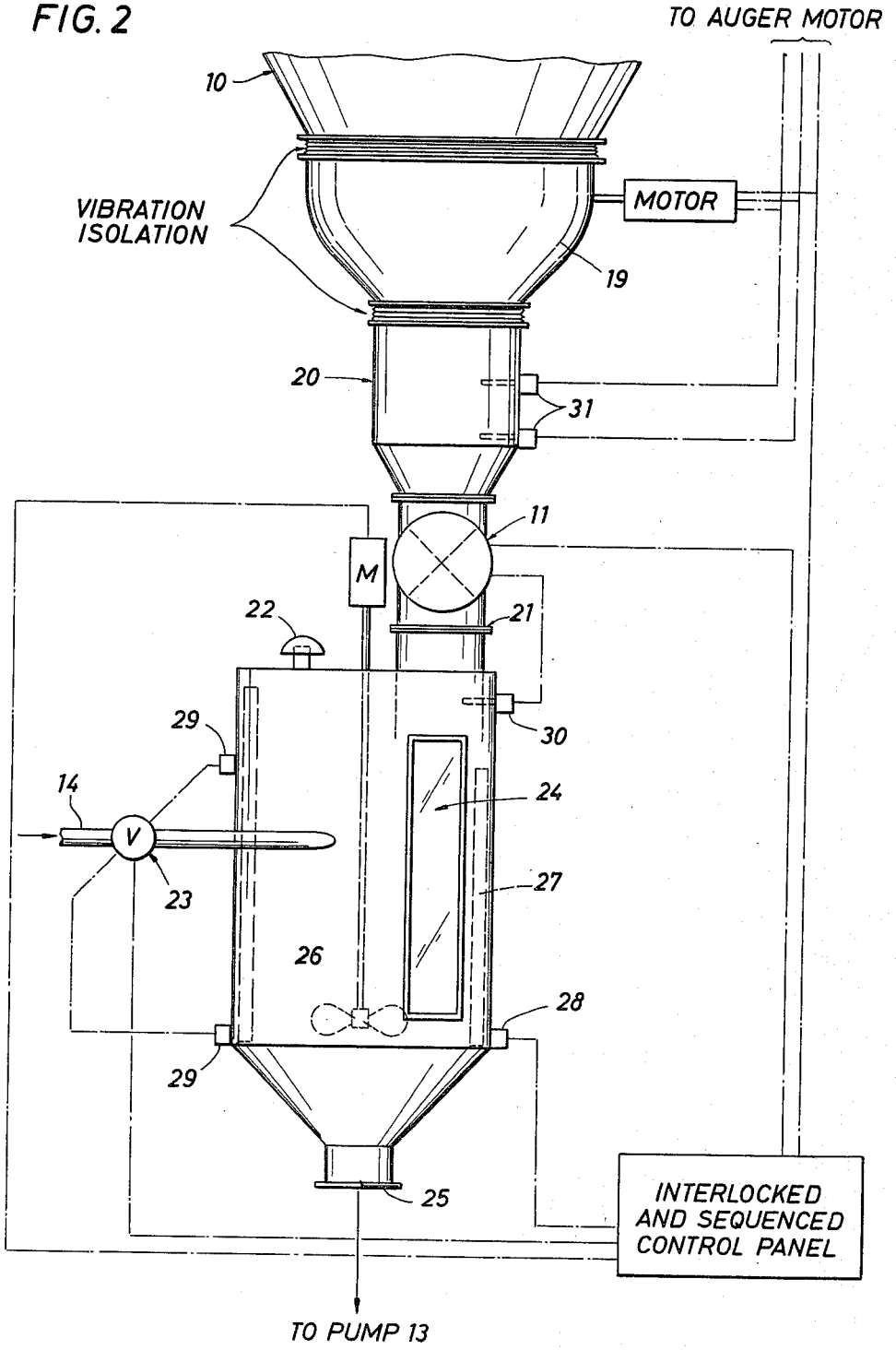

INJECTION SYSTEM FOR SOLID FRICTION REDUCING POLYMERS

This is a division of application Ser. No. 965,804, filed Dec. 4, 1978, now U.S. Pat. No. 4,263,926.

BACKGROUND OF THE INVENTION

Many polymers are known to be useful, in dissolved form, for reducing the flowing friction of various liquids, e.g., hydrocarbons in pipelines. Generally, the friction reduction capabilities of such polymers are directly proportional to molecular chain length. Reduction of chain length commonly occurs through exposure of the dissolved polymer to the action of pumps, etc. In a long pipeline it is therefore desirable to provide freshly dissolved polymer all along the length of the pipeline. To accomplish this, the polymer is injected in the line as solid particles, in a range of size, and allowed to dissolve in situ in the flowing hydrocarbon in the pipeline. Smaller particles more quickly dissolve and provide friction reduction in the first segments of the pipeline, and the larger particles pass through pumps without adverse effect and provide friction reduction in subsequent segments of the pipeline. However, use of such polymer particles is not without problems. For example, the particles are easily compressed into large chunks. Storage for a short period of time will cause the polymer to cold flow together under its own weight when piled to heights in excess of a few feet. To break up the lumps of compressed polymer requires expensive equipment and considerable time. The cold flow effect causing lumping, also makes the polymer unsuitable for direct injection with a suspending medium to carry the polymer particles.

Storage of the polymer in a suspending medium facilitates injection and alleviates cold flow problems but in turn leads to other equally difficult problems. In a water suspension, the polymer tends to float and easily fouls pumping equipment. In an oil suspension, the polymer will begin to dissolve and form an oily, spongy mass after a few hours time which can only be handled with great difficulty.

The present invention overcomes the above and other problems by providing a new technique for storing and injecting solid polymer particles into pipelines.

Patents pertinent to the present disclosure include U.S. Pat. Nos. 3,884,252; 2,306,926; 2,486,650; 2,648,572; 3,720,216; 3,730,275 and 3,736,288.

SUMMARY OF THE INVENTION

A purpose of the present invention is to provide a technique for the storage of solid polymer particles which avoids problems of the prior art with cold flow of the polymer.

Accordingly, the present invention provides a method and apparatus for maintaining polymer particles in readily recoverable, discrete form during storage by providing a storage hopper having a cone bottom and an auger extending upwardly from the apex of the cone bottom; disposing particulate polymer within the hopper; and rotating the auger to force contacting particulate polymer upward in the hopper.

Yet another purpose of the present invention is to provide a technique for forming a polymer/liquid slurry and injecting the slurry into a pipeline.

Accordingly, in addition the present invention provides a method and apparatus for injecting particulate polymer into a pipeline hydrocarbon by providing a mixing chamber having a rotary metering valve at the upper end of the chamber; admitting particulate polymer to the chamber via the rotary metering valve; spraying liquid tengentally into the chamber; removing a slurry of particulate polymer and liquid from the chamber; and, injecting the slurry into the pipeline hydrocarbon.

Alternately, a bin activator and intermediate solids hold-up are provided between the hopper and the metering valve. The bin activator aids in assuring a continuous supply of solids. The intermediate hold-up with a vibrating arm solids level sensor precludes packing or jamming of the metering valve. Similarly, a stirrer and internal baffles in the mixing chamber will assist in forming a uniform slurry.

The bin activator and auger, solids metering valve, and liquid supply valve are controlled by solids or liquid level sensors to assure proper supply of materials. All motors and valves are interlocked and sequenced to allow a simple start-up.

In a preferred embodiment, the storage apparatus is disposed above the mixing apparatus and the direction of the rotation of the auger is reversed to pass polymer particles downwardly into the mixing chamber via the rotary metering valve. Even more preferably, the storage hopper and mixing chamber are mounted on a skid, trailer or the like so as to be able to serve more than one location.

DESCRIPTION OF THE DRAWINGS

FIG. 2 shows a detailed view of the mixing chamber and associated equipment.

DESCRIPTION OF PREFERRED EMBODIMENTS

Figure 1:
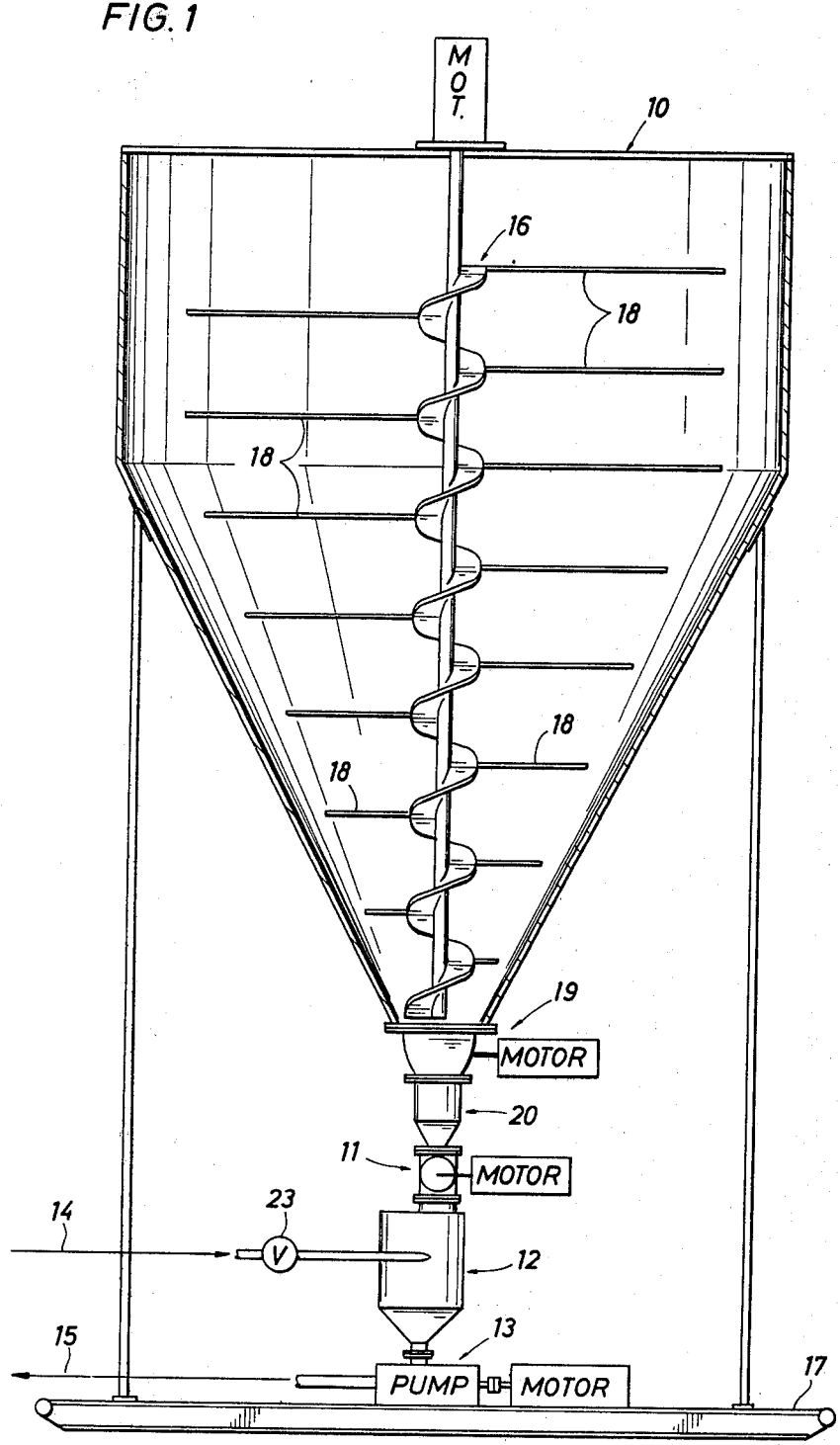
FIG. 1 discloses the complete apparatus, both storage hopper and mixing chamber, mounted on a skid.

FIG. 1 of the drawings discloses an overall view of the solid polymer injection system of the present invention which comprises the basic components—a storage hopper with rotary valve, mixing chamber and a pumping unit. A hopper 10 is mounted above a metering valve 11 which in turn provides entry to a mixing chamber 12. Beneath the mixing chamber is a pump and motor 13 which provides suction to pass the polymer/liquid slurry out of the mixing chamber and into a pipeline containing, for example, crude oil. Thus, water or some other fluid such as a hydrocarbon is admitted to the mixing chamber via line 14 while the slurry is taken out of the mixing chamber and placed into the pipeline via line 15. Auger 16 revolves within hopper 10 in one direction during storage of the polymer particles therein to cause the polymer particles to cycle upwardly about the auger and then down the inside of the outer walls of the hopper in a continuous fashion to prevent the particles from cold flowing. When it is decided to admit the particles to the mixing chamber along with some liquid such as water or oil, the direction of auger 16 is reversed and the polymer particles pass into air lock valve 11 as above discussed. All of these units are mounted on a skid 17 or some other such portable device as a trailer.

The above describes the most simple embodiment of the present invention and is suitable for relatively nonblocking and no-cold flowing materials. For difficult to handle materials, the operation is improved by addition of solid rods or fingers 18 to the auger 16 which break up blocked polmer particles away from the auger. Similarly, a Vibrascrew type bin activator 19 at the hopper exit precludes blockage of polymer particles at the exit. The intermediate hold-up 20 assures a steady supply of loose polymer particles to the metering valve 11 in case of variable feed rates from the hopper 10.

FIG. 2 discloses the mixing chamber in more detail. Polymer crumb is admitted into the chamber 12 through a metering valve in the direction shown by the arrow at the top of the device. A flange 21 is provided to attach metering valve 11 to the mixing chamber. A vent 22 is provided to vent the chamber as needed. Oil or water is admitted into the chamber tangentially via line 14 and control valve 23. Sight glass 24 facilitates visual observation of the device during operation. Polymer/liquid slurry exits the mixing chamber via line 25 and passes to pump suction. For difficult to suspend materials, the mixing chamber is equipped with a stirrer 26 and internal baffles 27.

The various motors and control valves are interlocked in such a manner that during start-up at a predetermined injection rate, the following sequence of events occurs automatically: Liquid control valve 23 opens, metering valve 11 begins to operate, bin activator 19 begins to operate, auger 16 begins to turn, injection pump 13 starts to pump. During shut-down the sequence is as follows: Auger 16 stops, bin activator 19 stops, metering valve 11 stops, liquid control valve 23 closes after 1 to 3 mixing chamber displacements, injection pump 13 stops on signal from low level shut-off sensor 28. During injection, liquid control valve 23 is automatically adjusted by liquid high and low level sensors 29. Mixing chamber 12 overfilling by solid polymer is precluded by solids level sensor 30 which controls the metering valve 11. The bin activator 19 and auger 16 are controlled by solids high and low level sensors 31 in the intermediate hold-up 20.

Polymers suitable for use with the invention are solid particulates which upon dissolution in some liquid, such as a hydrocarbon or hydrocarbon derivative, provide some measure of flowing friction reduction. Preferred polymers include polyisobutylene, polyisoprene, polydimethylsiloxane, polybutadiene, and polystyrene or block copolymers thereof.

The mixing of solid polymer and suspending liquid in accordance with the present invention just prior to pumping and injection allows the storage of the polymer at atmospheric conditions. This eliminates the problem of polymer and solvent liquids gelling within the system during a shutdown or the premature dissolution of polymer by solvent vapors or liquids. In addition, when the polymer is solvent in the suspending liquid, very little polymer is dissolved at the time it is pumped. In this way, the degradation of the dissolved polymer that occurs as it moves through the high shear conditions within the injection pump is minimized. This makes more polymer available for drag-reduction because less is destroyed during the injection process.

The polymer can arrive at the injection site in several forms such as solid bale, dry polymer particles partially reduced to required size, fully reduced dry polymer particles, or a fully sized polymer slurry in a non-solvent. The last two forms do not require pre-treatment prior to transfer to the storage hopper or agitated tank. The first two forms do, however, require particle sizing. Such sizing can be achieved by conventional devices such as hammer mills, knife mills or pin mills. Addition of micron size powder such as calcium carbonate to the mill eases size reduction by precluding agglomeration of freshly sheared polymer particles. The sizing equipment can be mounted on an injection skid, its own separate skid, or be trailer mounted so as to be able to serve more than one location.

The storage hopper 10 is sized to meet anticipated injection rates. It serves as storage for the solid polymer crumb and as a density conditioner. Integral auger 16 keeps the crumb in the hopper loose. The tendency of the crumb to compact under its own weight is eliminated by the hopper and the particles fed to the mixing chamber have a constant weight to volume ratio.

Sides of the cone bottom of hopper 10 range from about 45 degrees to about 75 degrees slope depending upon the physical characteristics of the polymer. The horsepower requirement for auger 16 depends upon the unit density of the polymer and the volume of the hopper but ranges from about 0.06 hp/ft$^3$ to about 0.25 hp/ft$^3$.

As mentioned, crumb is fed from hopper 10 to mixing chamber 12 by rotary metering valve 11. Thus, the rotary valve dumps a known volume of crumb into the mixing chamber with each revolution. Preferably, a variable drive (not shown) on the valve allows crumb rate to be controlled.

Mixing chamber 12 may be a section of a pipe with a conical bottom. Chamber sizes range from about 6 inches diameter to about 24 inches diameter depending on required concentration of polymer and injection rate. The mixing chamber should provide a 1 to 5 minute slurry hold-up to assure reasonably uniform slurry concentrations. Oil or water, at a flow rate from 1 to 50 gpm, is sprayed tangentially into the mixing chamber flooding the lower part. The oil or water flow rate preferably is automatically controlled by an interlock with the rotary valve so as to give solids concentration ranging from 1.0% weight to 50% weight. Crumb falls into the mixing chamber, which may have an agitator and baffles, from above and is suspended by the water or oil. Suction piping 25 to a pump (not shown) leaves the mixing chamber at the bottom.

The pumping unit (not shown) is a rotary positive displacement type selected for its capability to pump high concentrations of polymer particles and water. Gear type, lube type, centrifugal or diaphragm type pumps may also be used for concentrations of 25% weight polymer particles or less with selection in size to suit injection rates and pressures. An hydraulic variable drive on the pump allows varying injection rates. The injection rate may be automatically controlled by the pipeline pump station discharge pressure so as to maintain a desired pressure at a given flow rate.

All of the above equipment preferably is skid mounted for easy movement. Hoppers may be interchangeable and can be used as shipping containers for the polymer particles. However, the hopper may also be an integral part of the skid. In such a case, the hopper is loaded with polymer particles by conveyor or pneumatic system (not shown). The loading system may similarly be an integral part of the skid. All support equipment, i.e., electrical, piping, etc., may be mounted on the skid. To attach the system for injection, a water or oil supply hose; an injection hose and valve on the pipeline; and, an appropriate electrical receptacle to plug the drop cord into, are required.

When using oil as a suspending medium, a nitrogen purge (not shown) on the hopper is required. A positive pressure of a few inches of water is required to keep polymer dissolving vapors from entering the hopper.

The injection pump drive, water/oil metering control valve, and hopper bin activator and metering valve, are controllably interlocked. Variations in injection pump rate result in automatic and corresponding variations in the metering valve rate in water/oil feed rate.

The mixing chamber contains water/oil and polymer particle limit switches. The water/oil limit switch precludes flooding or draining of the mixing chamber by decreasing or increasing the liquid feed rate. Vibration type solids level detection switches, or other devices, serve to provide a proper amount of polymer to the mixing chamber.

Mixable and injectable polymer to liquid ratios range from 10% to 50%. The preferred range is from 20% to 30%.

The polymer particle slurry can be injected into main line pump suctions. Thus, the injection pumps do not require high pressure capability. The polymer particles do not have any adverse effect on the main line pumps, and the main line pumps do not degrade the undissolved polymer particles.

Having thus described the invention, the following example more particularly describes specific embodiments of the invention:

EXAMPLE

It is desired to expand the throughput capacity of a 24-inch crude oil pipeline from 400,000 bpd to 440,000 bpd while maintaining constant pump discharge pressures. The line is 450 miles long with a total of 8 pump stations. The dissolution rate of the chosen friction reducing polymer is such that 7/32-inch particles will dissolve not sooner than 400 miles and not later than 430 miles of travel. Thus, solid polymer is available for dissolution and friction reduction after every pump station. The main line centrifugal pumps degrade dissolved polymer. A total of 2,000 lbs. of polymer per day is required to yield the desired friction reduction of 15%. The density of the polymer is 57 lbs/ft$^3$. The bulk density of calcium carbonate dusted 7/32-inch size particles is 30 lbs/ft$^3$ when in a relatively loose state. The storage hopper must have a capacity of 300 ft$^3$ for daily recharging of polymer and a capacity of 2,100 ft$^3$ for weekly recharging of polymer. The recommended storage hopper has a 60° inclined angle conical bottom. For daily recharging its dimensions are 6.75 ft. diameter and 12.5 ft. total height while for weekly recharging, its dimensions are 12.75 ft. diameter and 24 ft. height.

The polymer injection rate is 6.25 lbs/min. or 1.6 gal/min. of unconsolidated material. The recommended polymer concentration in the slurry is 25% by volume. The above conditions are satisfied by a solids metering valve delivering 1.6 gal/min., a liquid control valve delivering 2.4 gal/min., and an injection pump delivering 3.3 gal/min. Both the intermediate hold-up and mixing chambers are designed for a 3 minute hold-up and have active volumes of 5 gal. and 10 gal. respectively in addition to an inactive gas capacity of 1 gallon and 2 gallons respectively. The mixing chamber is equipped with a stirrer to assure uniform suspension of polymer in the liquid.

We claim as our invention:

1. A method for maintaining polymer particles in readily recoverable, discrete, liquid-free form during storage comprising, providing a storage hopper having a cone bottom and an auger extending upwardly from the apex of the cone bottom; disposing particulate polymer within the hopper; rotating the auger to force contacting particulate polymer upwardly in the hopper; and vibrating the lowermost part of the cone bottom.

2. The method of claim 1 wherein fingers are attached to the auger and are rotated with the auger to loosen particulate polymer away from the auger.

3. Apparatus for maintaining polymer particles in readily recoverable, discrete form during storage comprising, a storage hopper having a cone bottom and an auger extending upwardly from the apex of the cone bottom; means for disposing particulate polymer within the hopper; means for rotating the auger to force contacting particulate polymer upwardly in the hopper; and means for vibrating the lowermost part of the cone bottom.

4. The apparatus of claim 3 including fingers attached to the auger.

* * * * *